United States Patent
Even et al.

(10) Patent No.: US 7,109,436 B2
(45) Date of Patent: Sep. 19, 2006

(54) LASER SHOCK PEENING TARGET

(75) Inventors: Edward Michael Even, Mason, OH (US); Danny Lee Neal, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 10/651,678

(22) Filed: Aug. 29, 2003

(65) Prior Publication Data

US 2005/0045598 A1  Mar. 3, 2005

(51) Int. Cl.
B23K 26/00  (2006.01)
(52) U.S. Cl. .......................... 219/121.68; 219/121.69; 219/121.82; 219/161; 269/87.3; 269/257
(58) Field of Classification Search ............ 269/43–45, 269/217, 234, 291, 309, 900, 87.2, 87.3, 269/257; 219/121.65–69, 121.76–77, 121.82, 219/85, 158, 161; 29/238, 281.1
See application file for complete search history.

(56) References Cited

U.S. PATENT DOCUMENTS

| | | | | |
|---|---|---|---|---|
| 3,377,703 A | * | 4/1968 | Longobardi | 30/330 |
| 3,711,712 A | * | 1/1973 | McLaren | 378/163 |
| 3,982,740 A | * | 9/1976 | Gutman | 269/110 |
| 4,243,213 A | * | 1/1981 | Georgian | 269/137 |
| 4,258,898 A | * | 3/1981 | Tuzzolino | 249/119 |
| 4,401,477 A | * | 8/1983 | Clauer et al. | 148/525 |
| 4,847,467 A | * | 7/1989 | Ausilio | 219/121.63 |
| 4,937,421 A | * | 6/1990 | Ortiz et al. | 219/121.68 |
| 4,967,655 A | * | 11/1990 | Holderegger et al. | 101/128.1 |
| 5,015,003 A | * | 5/1991 | Ramunas | 279/123 |
| 5,078,164 A | * | 1/1992 | Doellgast | 134/166 R |
| 5,090,664 A | * | 2/1992 | McCullough et al. | 254/104 |
| 5,280,893 A | * | 1/1994 | Sixtensson | 269/154 |
| 5,591,358 A | * | 1/1997 | Quagline | 219/121.63 |
| 5,718,420 A | * | 2/1998 | Bernstein | 269/138 |
| 5,730,811 A | | 3/1998 | Azad et al. | |
| 5,948,293 A | * | 9/1999 | Somers et al. | 219/121.85 |
| 6,149,146 A | * | 11/2000 | Pleban | 269/246 |
| 6,197,133 B1 | | 3/2001 | Unternahrer et al. | |
| 6,200,689 B1 | * | 3/2001 | Ferrigno et al. | 428/600 |
| 6,235,241 B1 | * | 5/2001 | Catt et al. | 422/56 |
| 6,296,448 B1 | | 10/2001 | Suh et al. | |
| 6,309,608 B1 | * | 10/2001 | Zhou et al. | 422/131 |
| 6,427,995 B1 | * | 8/2002 | Steinwall | 269/283 |
| 6,479,790 B1 | * | 11/2002 | Graham et al. | 219/121.85 |
| 6,570,125 B1 | | 5/2003 | Suh et al. | |
| 6,570,126 B1 | * | 5/2003 | Suh et al. | 219/121.85 |

(Continued)

FOREIGN PATENT DOCUMENTS

GB  002142575 A  *  1/1985

OTHER PUBLICATIONS

Conventional Laser Shock Peening Alignment Fixture, five (5) photos of fixture in public use in USA for more than 1 year prior to Jul. 1, 2003.

Primary Examiner—Samuel M. Heinrich
(74) Attorney, Agent, or Firm—Theodore P. Cummings; Francis L. Conte

(57) ABSTRACT

A laser target includes a shank having a first wedge converging from a step to a distal end of the wedge. A complementary second wedge is mounted on the step and converges with the first wedge. The two wedges have respective target apertures aligned with each other transversely therethrough.

24 Claims, 5 Drawing Sheets

U.S. PATENT DOCUMENTS

2001/0010160 A1* 8/2001 Grosser-Samuels ............. 63/3

2004/0117995 A1* 6/2004 Reed et al. ................... 33/286

* cited by examiner

LASER SHOCK PEENING TARGET

BACKGROUND OF THE INVENTION

The present invention relates generally to manufacturing processes, and, more specifically, to laser shock peening.

The strength of a metal workpiece may be improved by introducing compressive residual stress in the external surface thereof. Shot peening is one conventional process to introduce such residual compressive stress.

Another process uses the high energy of an industrial laser beam to burn an ablative coating on the workpiece within a confinement layer such as water which causes an instantaneous explosion, and the corresponding introduction of plastic deformation in the workpiece surface for introducing the residual compressive stress. In such laser shock peening (LSP) the laser operates in a pulse mode, with laser beam pulses being traversed across the surface of the workpiece for introducing the residual stress therein.

The continuing development of the LSP process includes splitting the laser beam into two opposite beams which strike opposite surfaces of the workpiece for particular advantage. Since the main beam from the laser generator is split in two, its two components simultaneously impact the opposite sides of the workpiece. However, the two split beams require precise alignment with the workpiece to ensure that the simultaneous impact occurs at oppositely aligned spots on the workpiece for increasing efficiency of operation.

One exemplary workpiece which may benefit from the use of the LSP process is the airfoil commonly found in gas turbine engines in the compressor or turbine sections thereof. A typical airfoil has a concave pressure side and an opposite convex suction side joined together at chordally opposite leading and trailing edges, and extending in radial span from a root to a tip. At the root is a platform which defines the inner flow boundary for the airfoil, and an integral dovetail may extend below the platform for removably mounting the airfoil blade into the corresponding slot of a supporting rotor.

Each engine includes many rows of such airfoils in the compressor and turbine sections thereof, and LSP is required for the full complement of airfoils in each row as desired. Accordingly, the LSP process must be repeated to cover the substantial external surface of each airfoil, and then repeated for the multiple airfoils for each rotor stage. The corresponding manufacturing time accordingly increases the cost of the process.

The process necessarily begins with an alignment procedure to ensure that the two opposite laser beams are aligned with the opposite sides at the same location of an individual airfoil. The airfoil itself is suitably mounted in a fixture which is attached to the distal end of a conventional, multiaxis computer numerically controlled (CNC) robot or manipulator. The manipulator includes a computer controller which is suitably programmed in software for controlling the desired movement of the workpiece airfoil relative to the stationary laser and the beams emitted therefrom. In this way, the workpiece is precisely moved in three-dimensional space for traversing the laser beams in a predetermined path over the surface of the airfoil to effect complete laser shock peening thereof, which is simultaneous for both sides of the airfoil.

Although the pressure and suction sides of the airfoil are curved in the typical manner, the two sides generally face oppositely to each other which permits relatively quick alignment of the two laser beams generally opposite with each other at about 180 degrees. A conventional alignment procedure has been used for over a year in this country to prepare the manipulator for the LSP processing of airfoil workpieces which have been sold and are found in commercial use.

The alignment process includes a conventional alignment fixture in the form of a rectangular beam having a transverse through hole in the distal end thereof. Two annular cover plates are mounted in the common hole through opposite sides of the fixture, with each plate including a center aperture transversely aligned with the opposite aperture. The two plates have corresponding internal circular seats which adjoin each other along the longitudinal center plane of the fixture, and support two target sheets trapped inside the through hole.

The fixture may then be attached to the distal end of the manipulator which is programmed to position the through hole and the aligned apertures thereat at the focal or intersection point of the opposite laser beams. In this way, the laser beams may be directed through the corresponding opposite apertures in the alignment fixture to mark the target sheets in the alignment procedure. The target sheets may be formed of a suitable material such as photographic or bum paper, which will produce a visible mark when exposed to the laser beam, typically produced by operating the high power LSP laser at a suitably low power setting.

The corresponding burn marks on the target sheets may then be examined and measured for any misalignment therebetween. The two laser beams should be aligned within a few mils of each other, and any measured discrepancy thereof may be suitably adjusted by adjusting the alignment of the laser beams using the conventional mirror adjustments found therein.

The alignment procedure may be repeated one or more times as desired to confirm the accuracy of alignment of the opposing laser beams relative to their intersection points on the alignment fixture. The alignment fixture may then be simply removed and replaced by the workpiece, such as an airfoil mounted to the manipulator on a suitable supporting fixture. The manipulator is then suitably programmed to position the airfoil with its opposite sides facing respective ones of the two laser beams so that the LSP process may be simultaneously effected on opposite sides of the airfoil with accurate alignment of the two impact sites. The manipulator then moves the mounted airfoil in three-dimensional space so that the two laser beams may traverse the external surfaces of the airfoil for laser shock peening thereof.

As indicated above, an individual airfoil for a gas turbine engine has curved pressure and suction sides which generally face oppositely to each other so that the oppositely aligned laser beams may simultaneously impact the opposite sides of the airfoil at substantially the same location in space. The airfoils typically twist from root to tip, yet the opposite external surface thereof may still be suitably aligned with the two laser beams by rotating the airfoil along its span axis to reposition the local sites of the airfoil between the opposite laser beams.

However, such twisting airfoils may be integrally formed with the supporting rotor in a unitary or one-piece blisk assembly. In an exemplary compressor blisk, the full row of airfoils extends radially outwardly from the supporting rotor with a relatively close spacing around the circumference thereof, with the individual airfoils nesting between the next adjacent airfoils. The adjacent airfoils in a blisk therefore prevent the use of laser beams aligned oppositely about 180 degrees apart due to the blocking effect thereof.

Accordingly, the LSP process requires that the two laser beams be realigned at an included angle substantially less than 180 degrees, and even down to a small acute included angle as low as about 20 degrees. In this way, the two laser beams may be directed to the opposite sides of an individual airfoil in a compressor blisk to avoid the obstruction of the next adjacent airfoils in the blisk.

In this configuration of the oblique laser beams, the initial alignment thereof becomes more complex. Since the conventional alignment fixture in the form of a rectangular beam has a small but substantial thickness, and the target apertures in the distal end thereof extend transversely through the fixture, the fixture itself introduces self-obstruction with the oblique laser beams particularly at small or acute included angles therebetween.

In order to effectively use the conventional alignment fixture with the oblique laser beams, one of the two cover plates is removed for removing the self-blocking effect thereof, and the target sheets are simply taped into the exposed through hole against the remaining cover plate. The so-modified alignment fixture is then conventionally used in the alignment procedure, with the oblique laser beams having elliptical projections on the target sheets due to the relative inclination therewith.

The elliptical laser beam projections increase the difficulty of aligning the opposite beams, and the alignment process requires iteration by replacing the marked target sheets with clean sheets again taped into the fixture hole. However, taping and untaping of the target sheets lacks accuracy or repeatability of location and further complicates the alignment procedure.

The alignment procedure for the oblique laser beams can therefore require up to about a half a day which is a substantial expenditure of time, which is typically repeated each and every day of the laser shock peening process for ensuring accuracy thereof. The alignment procedure therefore increases the overall time for laser shock peening the multitude of workpieces, and correspondingly increases the cost of manufacture.

Accordingly, it is desired to provide an improved laser shock peening target for reducing time of alignment of oblique laser beams.

BRIEF DESCRIPTION OF THE INVENTION

A laser target includes a shank having a first wedge converging from a step to a distal end of the wedge. A complementary second wedge is mounted on the step and converges with the first wedge. The two wedges have respective target apertures aligned with each other transversely therethrough.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
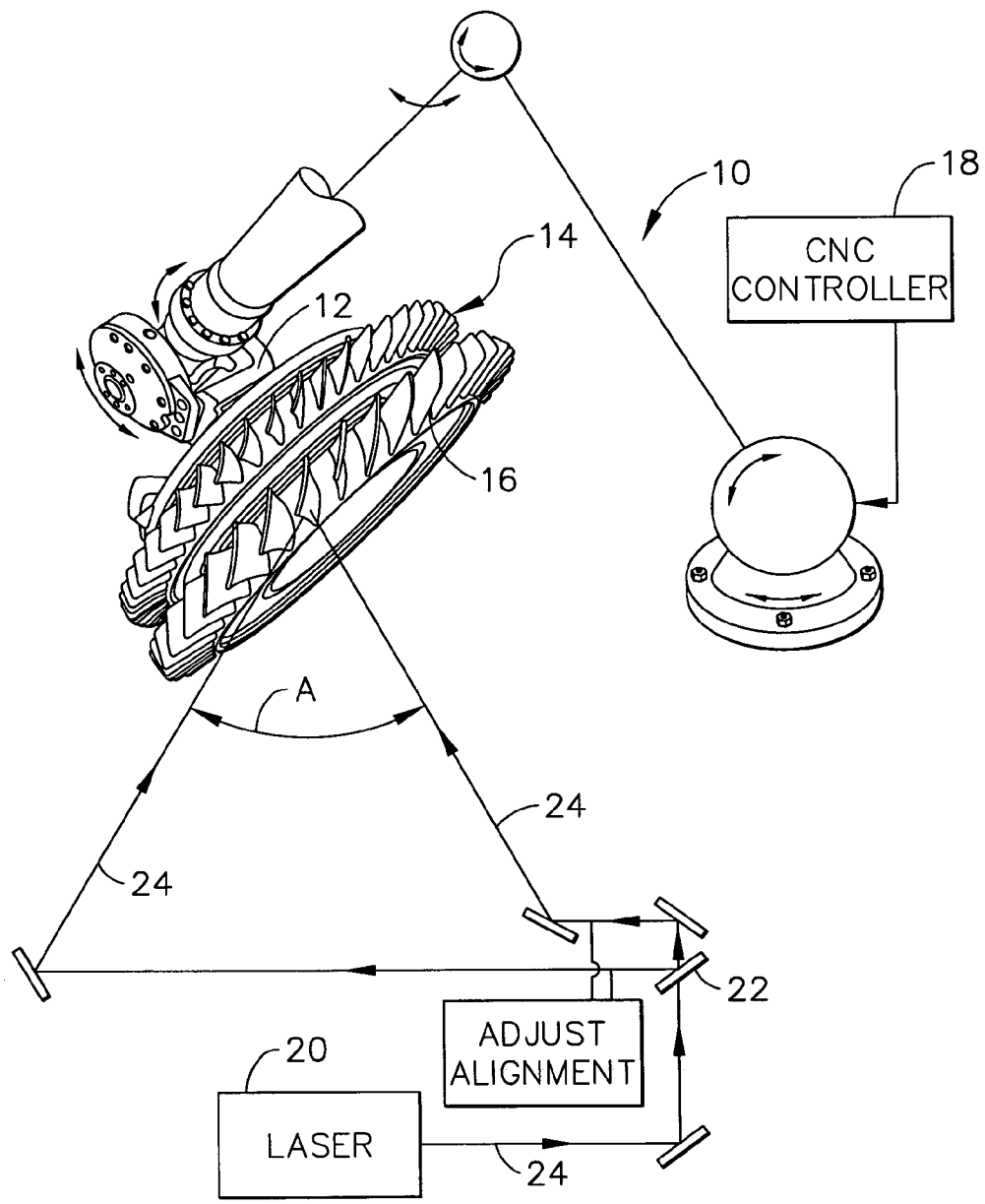
FIG. 1 is a schematic view of a computer numerically controlled manipulator configured for positioning an exemplary workpiece blisk between oblique laser beams for conducting laser shock peening thereof.

Illustrated schematically in FIG. 1 is a conventional multiaxis, computer numerically controlled (CNC) robot or manipulator 10 having a supporting bracket 12 at a distal end thereof on which may be suitably mounted a workpiece 14 in the exemplary form of a gas turbine engine compressor blisk having two integral rows of individual airfoils 16 in a unitary assembly. The manipulator may have any conventional form such as the Motoman UP165 Robot commercially available from the Yaskawa Company of West Carrollton, Ohio. The manipulator includes an arm articulated for movement along six axes of rotation so that the distal end bracket 12 may be located in three-dimensional space along the typical three axes of translation and three axes of rotation for positioning the workpiece 14 as desired within the range of the manipulator.

The manipulator includes a computer controller 18 (CNC) which can be conventionally programmed with suitable software for controlling the movement of the robotic arm, and in particular the workpiece mounted at the end thereof. In this way, the workpiece may be precisely located and orientated in three-dimensional space as desired for undergoing laser shock peening (LSP).

More specifically, cooperating with the manipulator in a combined apparatus is a high power industrial laser 20 and cooperating optical elements or optics 22 disposed in optical alignment therewith. The laser system including the laser 20 and optics 22 may have any conventional configuration and typically includes a conventional YAG laser having sufficient power for effecting laser shock peening. And, the optical elements include adjustable mirrors having micrometer mounting gimbals which permit precise optical alignment of the laser beam 24 emitted from the laser during operation.

For the LSP process, the optical elements of the laser system illustrated in FIG. 1 include a suitable beam splitter and mirrors for splitting the initially produced laser beam into two laser beam components which are suitably directed at an individual airfoil 16 of the workpiece 14.

As indicated above, each airfoil 16 illustrated in FIG. 1 has a generally concave pressure side and an opposite generally convex suction side extending between chordally opposite leading and trailing edges and extending from a radially inner root to a radially outer tip. Each airfoil is integrally formed with the supporting rotor in a one-piece unitary blisk configuration. In this way, a full row of airfoils extends integrally outwardly from the perimeter of the rotor, and the exemplary blisk illustrated in FIG. 1 includes two integral stages of airfoils therein.

Each of the airfoils includes twist or stagger from root to tip, and the airfoils are spaced closely together and nested around the circumferential of the blisk. Accordingly, each airfoil is hidden in part between the next adjacent airfoils on opposite circumferential sides thereof, and will block line-of-sight of laser beams directed at the surfaces of the airfoil at about 180 degrees apart.

Accordingly, the optics of the laser system illustrated in FIG. 1 are configured for directing the two split laser beams 24 obliquely with each other at an included angle A therebetween which is less than 180 degrees, and may be down to a small acute angle of about 20 degrees, for example. In this way, the two laser beams may be directed to the opposite surfaces of an individual airfoil without obstruction from the next adjacent airfoils in the blisk. The laser shock peening process may then be effected by guiding the two laser beams within the available space on the opposite sides of an individual airfoil, and avoid the obstruction or shadowing by the next adjacent airfoils either in the same row or from the next row of the exemplary two-row blisk configuration.

Figure 2:
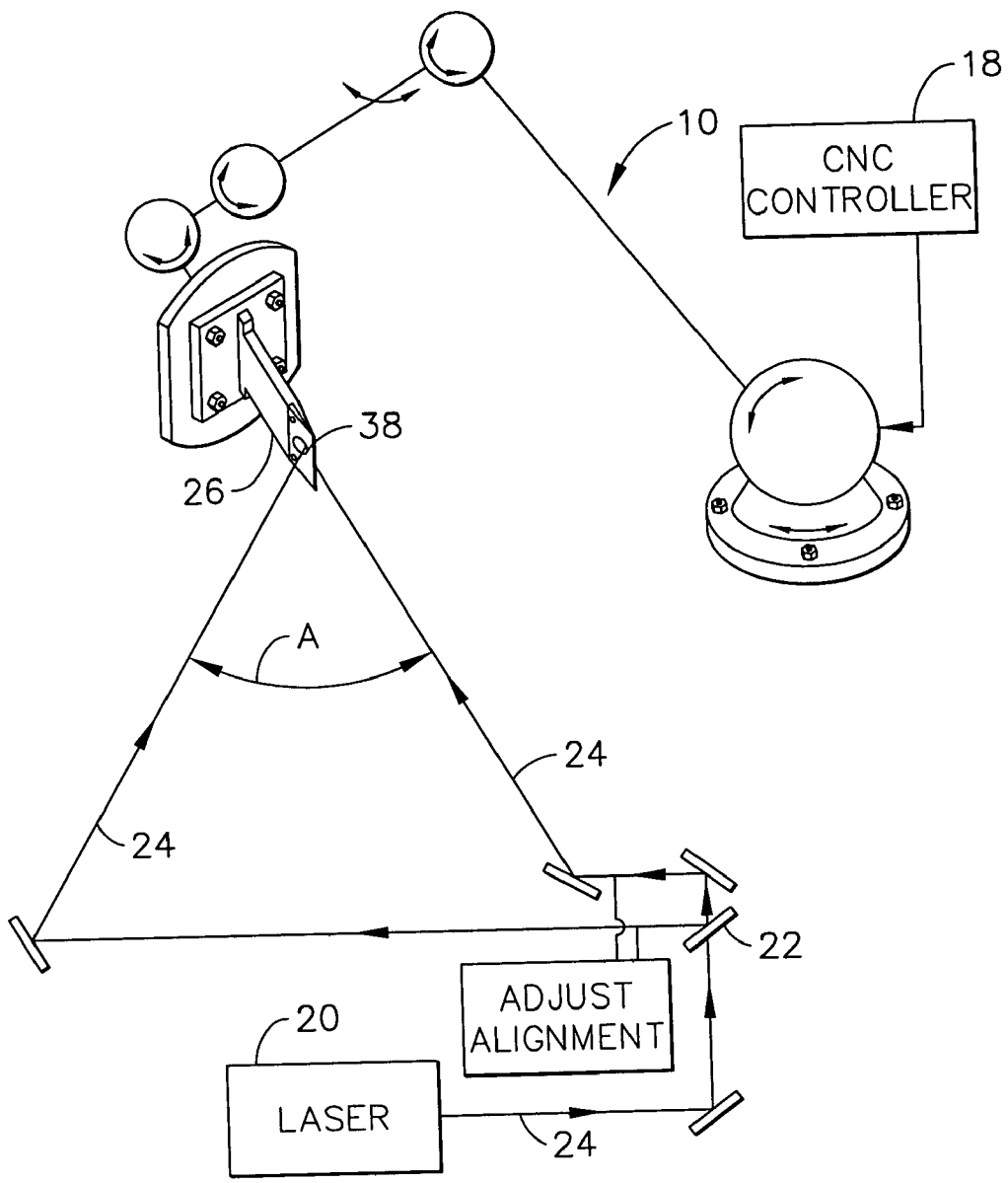
FIG. 2 is a schematic view, like FIG. 1, of the manipulator and laser during alignment of the two laser beams using an improved laser target mounted to the manipulator.

As indicated above, the oblique laser beams 24 require precise alignment with each other to ensure that they simultaneously impact the opposite sides of the airfoil workpiece with suitably precise alignment, and with minimal lateral offset therebetween. Accordingly, FIG. 2 illustrates a laser target 26 suitably mounted to the distal end bracket of the manipulator 10, instead of the workpiece, for use in the initial alignment with the laser system.

Figure 3:
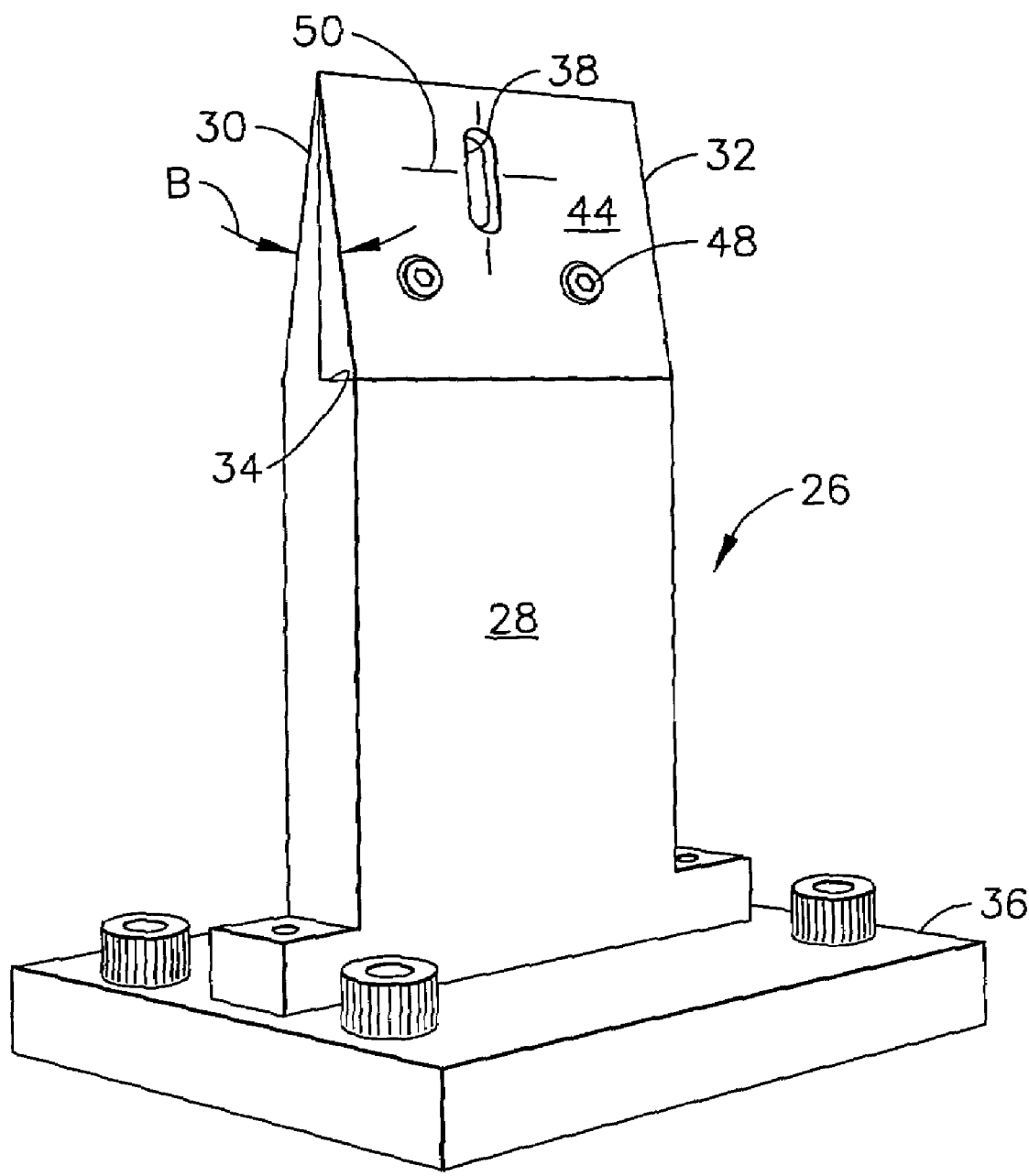
FIG. 3 is a isometric view of the laser target illustrated in FIG. 2 in accordance with an exemplary embodiment.

The laser target 26 is illustrated in more detail in isolation in FIG. 3 and may be formed of any suitable material such as metal. The target includes a straight rectangular shank having an integral or unitary first ramp or wedge 30 supporting thereto a complementary second ramp or wedge 32. The first wedge is integral with the distal end of the shank 28 and converges from a recess or step 34 in the shank to the distal end of the first wedge itself.

The second wedge 32 is a discrete component suitably fixedly mounted on the step 34 and converges with the first wedge 30 to the corresponding distal ends thereof. The opposite proximal end of the shank 28 is fixedly joined to a base plate 36 which is suitably configured for mounting the target to the bracket on the distal end of the manipulator illustrated in FIGS. 1 and 2. In this way, the shank 28 extends perpendicularly outwardly from the base plate 36 to position the two wedges 30,32 in the three-dimensional space illustrated in FIG. 2 for aligning the two split laser beams 24.

Figure 4:
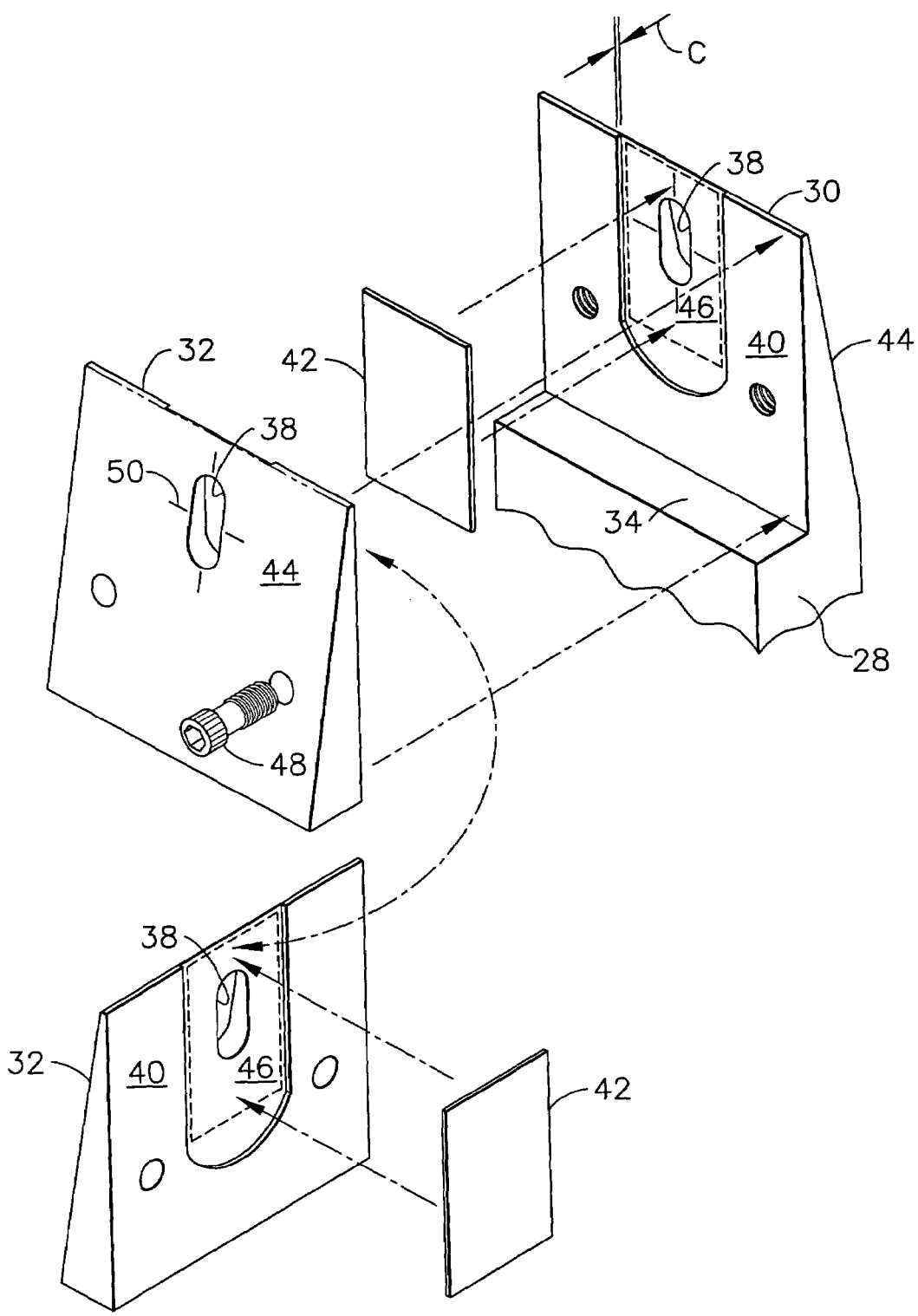
FIG. 4 is an exploded view of the distal end of the target shown in FIG. 3 illustrating assembly thereof.

More specifically, FIG. 4 illustrates additional details of the distal end of the target illustrated in FIG. 3. The first and second wedges 30,32 have respective target holes or apertures 38 aligned with each other transversely or laterally therethrough. The target apertures are also preferably mounted in the middle of the width of the two wedges as close as practical to the distal ends thereof.

The two wedges 30,32 are preferably mirror images of each other, and further include respective inboard flat seats 40 adjoining each other for supporting one or more target sheets 42 between the target apertures 38. The two wedges 30,32 are collectively arranged in a triangle terminating in an apex at the distal ends of the two wedges. The wedge triangle illustrated in FIG. 3 is preferably symmetrical and defines an isosceles triangle having an acute included angle B of about 25 degrees for example.

The two wedges 30,32 also include respective external flat faces 44 in which the target apertures 38 are mounted flush. In this way, the target apertures are mounted in the smooth external faces 44 of the two wedges, with the wedges having the small included angle B therebetween for presenting the apertures to the two laser beams illustrated in FIG. 2 with minimal obstruction by the target components immediately surrounding the target apertures.

As illustrated in FIG. 2, the apex end of the target may be positioned by the manipulator to face the two laser beams 24. The longitudinal axis of the target 26 is preferably aligned in the plane of the two laser beams 24 so that the two laser beams 24 are incident with the respective target apertures 38.

In the preferred embodiment illustrated in FIGS. 3 and 4, the target apertures 38 are oval, with corresponding major axes being normal or perpendicular with the shank step 34. The exemplary oval configuration illustrated in FIG. 4 includes straight sides extending along the longitudinal axis of the shank terminating in semi-circular ends which define a generally race-track configuration.

Since the target apertures 38 extend transversely through the corresponding wedges 30,32, they correspondingly decrease in thickness or depth between the shank step 34 and the common apex of the wedges. In this way, the target apertures 38 are thinner near the distal end of the wedges which is closest to the incident laser beams, and thicker at the base ends of the wedges where they join at the step 34.

Figure 5:
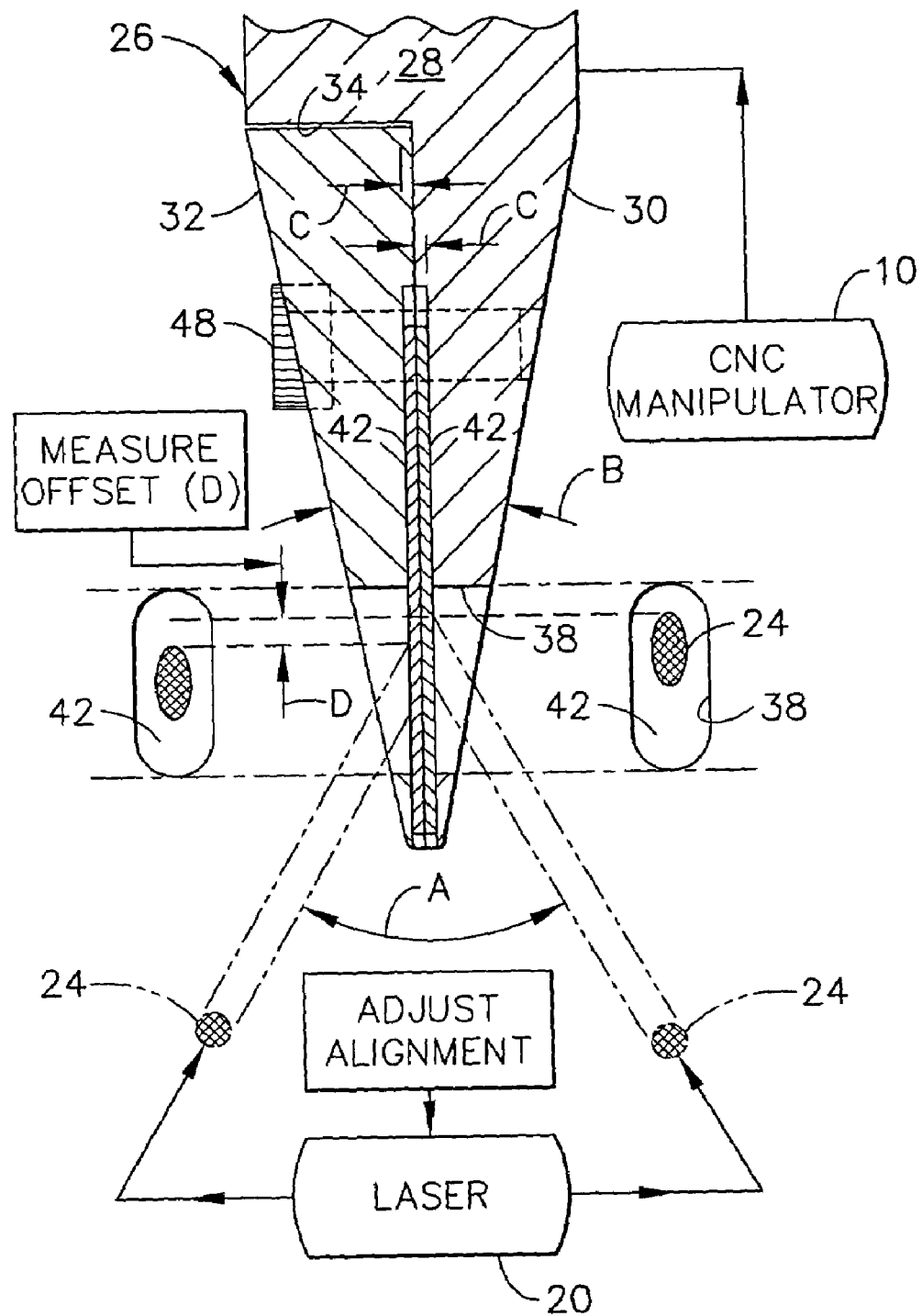
FIG. 5 is a partly sectional schematic view of the alignment configuration of FIG. 2 in more detail.

As shown in FIG. 4, each of the two seats 40 includes a respective recess 46 aligned with each other around the respective target apertures 38 to define a pocket for receiving the target sheet 42. The two recesses 46 preferably have equal depths C for aligning the mating plane of two target sheets 42 with the mating plane of the corresponding seats 40 of the two wedges 30,32. This is best illustrated in FIG. 5 wherein the two seats 40 adjoin each other along the longitudinal centerline plane of the shank and wedges. This positions the two sheets identically below the respective target apertures 38 on opposite sides of the target.

As illustrated in FIGS. 3–5, the second wedge 32 is removably joined to the first wedge 30 by one or more threaded bolts 48, such as the pair illustrated. The bolts extend through holes in the second wedge 32 and engage threaded apertures in the first wedge 30 for clamping together the two wedges, and clamping therebetween the two target sheets 42. The two bolts 48 are preferably located between the target apertures 38 and the shank 28 to prevent their obstruction of the incident laser beams. The heads of the bolts may be mounted substantially flush in the second wedge if desired.

The target sheets 42 illustrated in FIG. 5 may have any conventional composition such as photographic paper. The combined thickness of the two sheets 42 is preferably larger than the combined depth of the recesses 46 so that clamping of the second wedge to the first wedge correspondingly compresses and clamps the two sheets tightly therebetween and inside the corresponding recesses 46. The recesses 46 illustrated in FIG. 4 have a suitable configuration for surrounding the respective target apertures 38, and the target sheets 42 are suitably configured for being trapped within the corresponding recesses. In this way, the two target sheets are accurately clamped between the two wedges with identical orientation on opposite sides of the target for receiving the corresponding incident laser beams 24.

As shown in FIG. 4 each of the wedge faces 44 preferably includes a respective crosshair or crossmark 50 around the target apertures 38 for use in centering the laser beam therein during the alignment process. The visual crosshairs permit the operator to quickly align the two laser beams with a rough accuracy. The crosshairs also permit later adjustment of the laser beam alignment for reducing or minimizing any offset between the opposite beams.

More specifically, the improved target illustrated in FIGS. 3–5 may be used with the manipulator 10 and laser system illustrated in FIG. 2 for quickly aligning the two laser beams 24 for accurate laser shock peening of the exemplary blisk workpiece 14 illustrated in FIG. 1 with the oblique laser beams. As initially illustrated in FIG. 4, the second wedge 32 is initially assembled to the first wedge 30 with preferably a pair of the target sheets 42 clamped therebetween as illustrated in FIG. 5. The so assembled target is then suitably mounted to the manipulator 10 in FIG. 2 by joining the target base plate to the bracket at the distal end of the manipulator arm.

The manipulator is programmed with suitable software for carrying or moving the target on the distal end of the arm to position the opposite target apertures 38 in rough alignment with the two laser beams 24. For example, conventional, low power pointing laser beams may be used initially for the rough alignment of the target apertures with the corresponding paths for the main laser beams in a conventional manner.

The high power laser 20 itself may then be operated in a relatively low power mode to emit the split laser beams 24 to mark or burn the target sheets 42 exposed within the two target apertures. FIG. 5 illustrates schematically two burn marks thusly created in the two target sheets 42 exposed within the two target apertures 38. Any lateral offset D between the two burn marks may then be suitably measured, either roughly by eye or more accurately using a scale.

The offset of the two laser beams within the two target apertures 38 may be reduced or minimized by correspondingly adjusting alignment of the laser beams. This adjustment is effected in a conventional manner by adjusting, for example, the micrometer gimbals supporting the directional mirrors in the laser optics. For example, if one burn mark is slightly higher than the opposite burn mark, its optical alignment may be lowered relative thereto.

The second wedge 32 may then be disassembled from the first wedge for removing and replacing the two target sheets, and reassembling the wedges. The laser may then be operated again to mark the replacement target sheets to confirm the alignment of the two beams. If further adjustment is required, the process is repeated. Nevertheless, the use of the wedge target greatly simplifies the alignment procedure and substantially reduces the time required therefor to merely minutes instead of a half a day for the obliquely aligned laser beams.

As illustrated in FIG. 5, the wedge-shaped target 26 is preferably aligned with the two laser beams 24 generally symmetrically therewith so that each laser beam 24 is incident to each target aperture 38 at substantially equal incidence angles. In other words, the included angle A between the two laser beams 24 is split equally by the mating plane of the two wedges on opposite sides of which the two target sheets 42 are disposed.

In this way, the initially round laser beams 24 effect elliptical projections thereof inside the respective target apertures 38. The target apertures 38 are preferably oval as described above for surrounding the respective elliptical projections. And, the major axes of the elliptical beam projection and target apertures are preferably coextensive.

Due to the wedge configuration of the target, the target apertures vary in thickness being thinnest at the common apex of the wedges which first faces the incident laser beams and increases in thickness away therefrom. The converging wedges and the relatively sharp common apex thereof provides an enhanced target within the apertures, with the surrounding material of the apertures providing minimal obstruction, if any, to the incident laser beams.

Accordingly, the otherwise conventional CNC manipulator 10 and laser system illustrated in FIG. 2 may be quickly and easily aligned using the improved wedge-shaped target 26. The target apertures 38 have a precise and predetermined location relative to the base plate, and therefore relative to the bracket at the distal end of the manipulator arm.

Accordingly, upon alignment of the laser optics, the target 26 itself may be simply removed from the manipulator arm and substituted or replaced with the intended workpiece 14, such as the exemplary workpiece blisk. The computer controller 18 of the manipulator may then be loaded with the corresponding software for controlling the desired path of the workpiece relative to the so-aligned laser beams 24 for effecting laser shock peening of the external surface of the workpiece where desired. The laser 20 may then be operated in its high power, LSP mode of operation for accurately laser shock peening the opposite sides of each airfoil 16 of the exemplary workpiece blisk.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:

1. A laser target comprising:
   a shank having an integral first wedge converging from a step to a distal end of said wedge;
   a complementary second wedge fixedly mounted on said step and converging with said first wedge;
   said first and second wedges having respective oval target apertures aligned with each other transversely therethrough;
   said first and second wedges further including respective seats adjoining each other for supporting a target sheet between said target apertures, with said wedges defining a triangle terminating in an apex at distal ends of said wedges; and
   said first and second wedges further including respective external faces in which said target apertures are mounted flush.

2. A target according to claim 1 wherein said aligned target apertures decrease in depth between said shank step and said apex of said wedges.

3. A target according to claim 2 wherein seats include respective recesses aligned with each other around said target apertures to define a pocket for receiving said target sheet.

4. A target according to claim 3 wherein said recesses have equal depths for aligning the mating plane of two target sheets with the mating plane of said first and second wedges.

5. A target according to claim 4 further comprising a base plate fixedly joined to a proximal end of said shank.

6. A target according to claim 5 wherein said oval target apertures include corresponding major axes being normal with said shank step.

7. A target according to claim 6 wherein each of said faces includes a respective crosshair around said target aperture for centering a laser beam therein.

8. A target according to claim 7 wherein said second wedge is removably joined to said first wedge by a pair of bolts extending therethrough between said target aperture and said shank.

9. A target according to claim 8 further comprising a pair of said target sheets mounted in said recesses between said first and second wedges.

10. A target according to claim 9 in a combination apparatus with a computer numerically controlled multiaxis manipulator having a supporting bracket at a distal end thereof fixedly joined to said target base plate.

11. A laser target comprising:
 a shank having an integral first wedge converging from a step to a distal end of said wedge;
 a complementary second wedge fixedly mounted on said step and converging with said first wedge; and
 said first and second wedges having respective target apertures aligned with each other transversely therethrough.

12. A target according to claim 11 wherein said first and second wedges further include respective seats adjoining each other for supporting a target sheet between said target apertures, with said wedges defining a triangle terminating in an apex at distal ends of said wedges.

13. A target according to claim 12 wherein said first and second wedges further include respective external faces in which said target apertures are mounted flush.

14. A target according to claim 13 wherein said target apertures are oval with corresponding major axes being normal with said shank step.

15. A target according to claim 13 wherein seats include respective recesses aligned with each other around said target apertures to define a pocket for receiving said target sheet.

16. A target according to claim 15 wherein said recesses have equal depths for aligning the mating plane of two target sheets with the mating plane of said first and second wedges.

17. A target according to claim 13 wherein said second wedge is removably joined to said first wedge by a bolt extending therethrough between said target aperture and said shank.

18. A target according to claim 13 wherein each of said faces includes a respective crosshair around said target aperture for centering a laser beam therein.

19. A target according to claim 13 further comprising a base plate fixedly joined to a proximal end of said shank.

20. A target according to claim 19 in a combination apparatus with a computer numerically controlled multiaxis manipulator having a supporting bracket at a distal end thereof fixedly joined to said target base plate.

21. An apparatus according to claim 20 further comprising:
 a laser;
 adjustable optics disposed in optical alignment with said laser for directing two converging laser beams therefrom; and
 said manipulator being programmed for positioning said target apertures in alignment with respective ones of said two laser beams.

22. A method of using said apparatus according to claim 21 comprising:
 assembling said second wedge to said first wedge with said target sheet therebetween;
 carrying said target on said manipulator to position said target apertures in alignment with said laser beams;
 operating said laser to emit said laser beams to mark said target sheet within said target apertures;
 measuring any offset in marking of said target sheet between said target apertures; and
 adjusting alignment of said laser beams to reduce said offset thereof between said target apertures.

23. A method according to claim 22 wherein said target is aligned with said laser beams to effect elliptical projections thereof inside said target apertures, and said target apertures are oval for surrounding said elliptical projections, with major axes thereof being coextensive.

24. A method according to claim 23 further comprising:
 substituting a workpiece in said manipulator for said target following alignment of said laser beams; and
 operating said laser and manipulator for laser shock peening an external surface of said workpiece.

* * * * *